(12) United States Patent
Pierce et al.

(10) Patent No.: US 7,610,866 B2
(45) Date of Patent: Nov. 3, 2009

(54) RADIO CONTROLLED TREE PLANTER

(76) Inventors: Michael J. Pierce, 6473 E. Lake Dr., Grand Forks, ND (US) 58201; Kevin J. Pierce, 6473 E. Lake Dr., Grand Forks, ND (US) 58201; Austin M. Pierce, 6473 E. Lake Dr., Grand Forks, ND (US) 58201; Megan A. Pierce, 6473 E. Lake Dr., Grand Forks, ND (US) 58201

( * ) Notice: Subject to any disclaimer, the term of this patent is extended or adjusted under 35 U.S.C. 154(b) by 0 days.

(21) Appl. No.: 11/401,756

(22) Filed: Apr. 11, 2006

(65) Prior Publication Data

US 2006/0225898 A1 Oct. 12, 2006

Related U.S. Application Data

(60) Provisional application No. 60/669,995, filed on Apr. 11, 2005.

(51) Int. Cl.
*A01C 11/00* (2006.01)
*A01G 23/02* (2006.01)
(52) U.S. Cl. .................................. 111/101; 37/302

(58) Field of Classification Search ............... 111/101; 37/302
See application file for complete search history.

(56) References Cited

U.S. PATENT DOCUMENTS

| | | | | |
|---|---|---|---|---|
| 3,661,333 A | * | 5/1972 | Smith | 241/281 |
| 3,936,960 A | * | 2/1976 | Clegg | 111/101 |
| 2004/0244660 A1 | * | 12/2004 | Gabriel | 111/903 |

* cited by examiner

*Primary Examiner*—Christopher J. Novosad
(74) *Attorney, Agent, or Firm*—Robert E. Kleve (57) ABSTRACT

The invention comprises a radio controlled tree planter. The planter has four hydraulically controlled tree spades mounted on vehicle, with hydraulic cylinders to position the spades in a storage, position, a vertical digging position, and a actual digging action. A tv size radio transmitter has button controls for transmitting radio signals to a radio receiver mounted on the planter, which receiver in turn transmits signals to solenoids operating the hydraulic cylinders to thereby control the movement of the spades in the three positions of its operation to thereby control the digging operations of the spades within the range of the receiver from a remote location.

5 Claims, 16 Drawing Sheets

RADIO CONTROLLED TREE PLANTER

This invention relates to remote control for tree digging and or tree planter devices and the like. This invention is also related to my provisional patent application Ser. No. 60/669,995 filed Apr. 11, 2005, priority of which is claimed.

It is an object of the invention to provide a novel radio controlled remote control device for tree planter devices and the like.

It is another object of the invention to provide a novel hand operated TV transmitter type radio control device to transmit radio signals to a radio receiver mounted on the tree planter to control the operation of the tree planter from a remote location.

It is another object of the invention to provide a radio controlled tree digging, transporting, or planting devices which operations can be remotely controlled by a radio transmitter.

It is another object of the invention to provide a novel radio controlled tree spade device having solenoid actuated valves actuated by a remote radio transmitter for actuating the movement of the tree digging spades and positioning of the spades in and out of their digging and/or planting position on a mobile vehicle by an operator from a remote position relative to the vehicle.

Further objects and advantages of the invention will become apparent as the description proceeds, where:

BRIEF DESCRIPTION OF THE DRAWINGS

FIG. 8(1)A is a schematic diagram of the left portion of the electrical system of the planter, one of four sheets.

FIG. 8(1)B is a schematic diagram of the left portion of the electrical system of the planter, two of four sheets.

FIG. 8(1)C is a schematic diagram of the left portion of the electrical system of the planter, three of four sheets.

FIG. 8(1)D is a schematic diagram of the left portion of the electrical system of the planter, four of four sheets.

FIG. 8(2)A is a schematic diagram of the right portion of the electrical system of the planter, one of four sheets.

FIG. 8(2)B is a schematic diagram of the right portion of the electrical system of the planter, two of four sheets.

FIG. 8(2)C is a schematic diagram of the right portion of the electrical system of the planter, three of four sheets.

FIG. 8(2)D is a schematic diagram of the right portion of the electrical system of the planter, four of four sheets.

BRIEF DESCRIPTION OF PREFERRED EMBODIMENT

Briefly stated, the invention comprises a radio controlled electrical system or apparatus having a hand held radio transmitter which an operator can transmit control signals to a receiver mounted on the frame of a spade tree digger or planter so that the operator may control the movements of the spades of the planter and control the position of the spades on a mobile frame as the spades are moved from a storage position on the mobile frame to a vertical digging or planting position on the mobile frame from a remote location by the operation of the radio transmitter.

Figure 1:
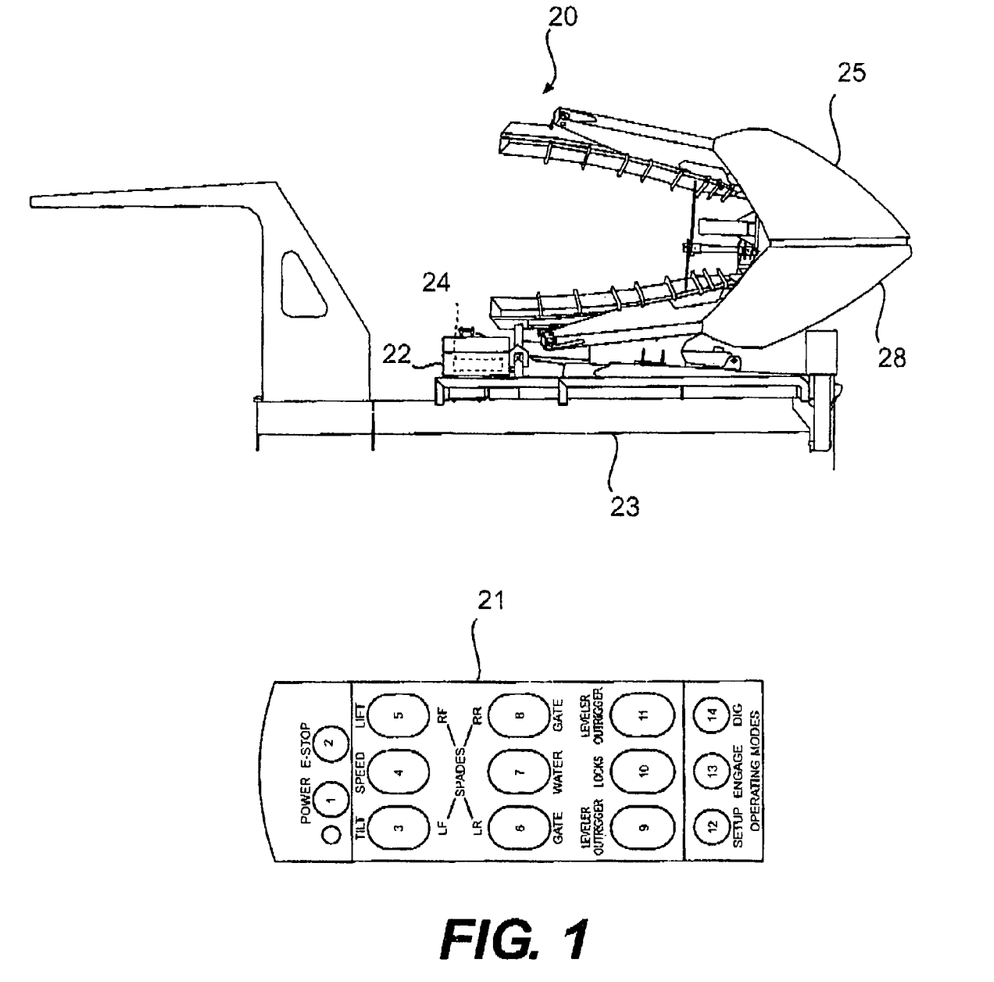
FIG. 1 is a plan view of the hand held push button radio control transmitter and a side view of a tree planter having a radio receiving box thereon to control the functions of the planter via the radio transmitter.

Referring more particularly to the drawings, in FIG. 1 radio controlled planter 20 with a push button portable, hand carried radio transmitter 21 is illustrated for operating the planter 20 hydraulic controls. A controller box 22 is mounted on the frame 23 of the planter 20. A radio receiver 24 is mounted in the controller box 22 and acts to receive radio signals from the transmitter when said transmitter is located remotely from the planter and controller box to operate the hydraulic controls.

The planter 20 has some fourteen hydraulic piston and cylinders in some twelve different hydraulic operations to operate the planter by movement of the four spades 25,26,27, 28 on the planter individually and simultaneously to dig or plant trees from a mobile vehicle 29.

The mobile vehicle or planter 20 has a pivotally mounted mast 30 pivotally mounted to the frame 29' of the vehicle and is pivotally mounted to the frame at pivot 30' to pivot from a horizontal storage position to a vertical preparatory position for digging or planting. The four spades are telescoping or slidably mounted to the mast to be raised and lowered on the mast in a customary manner, when the mast has been pivoted to a vertical position on the frame of the vehicle, for digging or planting trees.

The portable transmitter 21 is hand operated by the operator who uses its buttons to transmit radio signals from the transmitter 21 to the receiver 24 mounted in the controller box 22 in the frame 23 of the planter device. The radio receiver 24, in turn, transmits the signal electronically to the digital controller A, also in the controller box 22, which processes the signal according to its program; and it, in turn, transmits its signal to digital controller B, also in the control box 22 on the planter 20.

The digital controller B further processes the signal, depending upon which signal was transmitted; and, in turn, transmits its signal to one of the solenoid actuated valves to actuate electronically the solenoid of that valve to actuate that hydraulic valve to control to, in turn, control the operation of some 12 solenoid operated hydraulic control valves on the planter, which 12 solenoid operated control valves (B1-B9) A1,A2,A4 in turn, control the operation of the fourteen hydraulic pistons and cylinders 31-34, inclusive, on the planter, which cylinders to operate the planter through its three modes of operation.

The planter has three modes of operation utilizing these sixteen cylinders to control the planter in the three modes.

Figure 3:
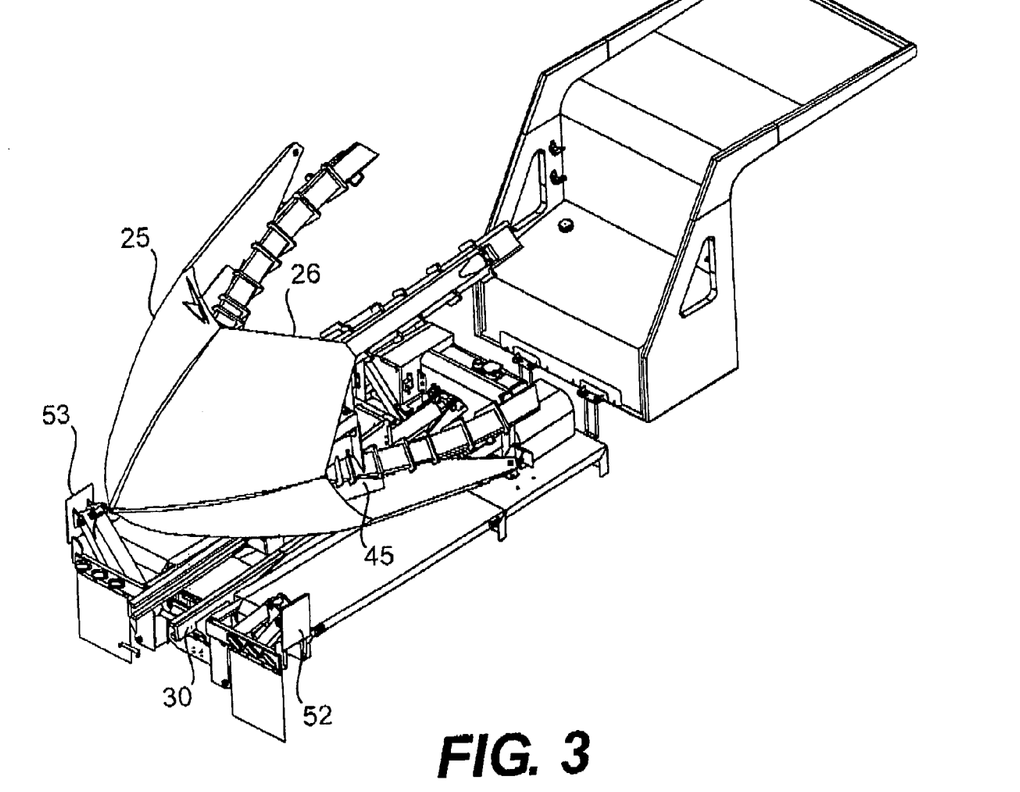
FIG. 3 is a perspective view of the planter device illustrating the radio receiving control box mounted on the frame of the planter device, and showing the spade mechanism of the operating functional mechanisms of the planter device in a storage position on the rear frame of the mechanism.
Figure 4:
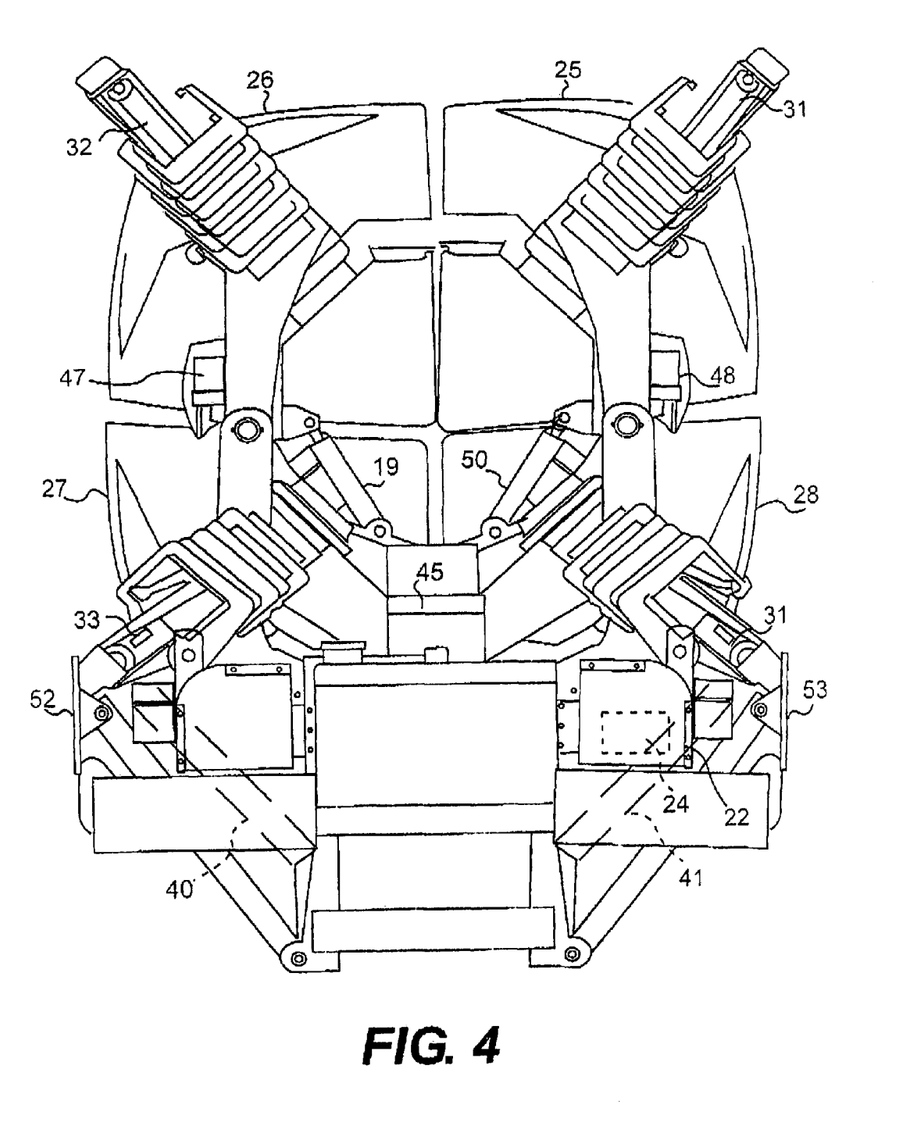
FIG. 4 is a front end view of the spade mechanism of the planter device on the rear frame of the planter in a storage position on the frame.
Figure 5:
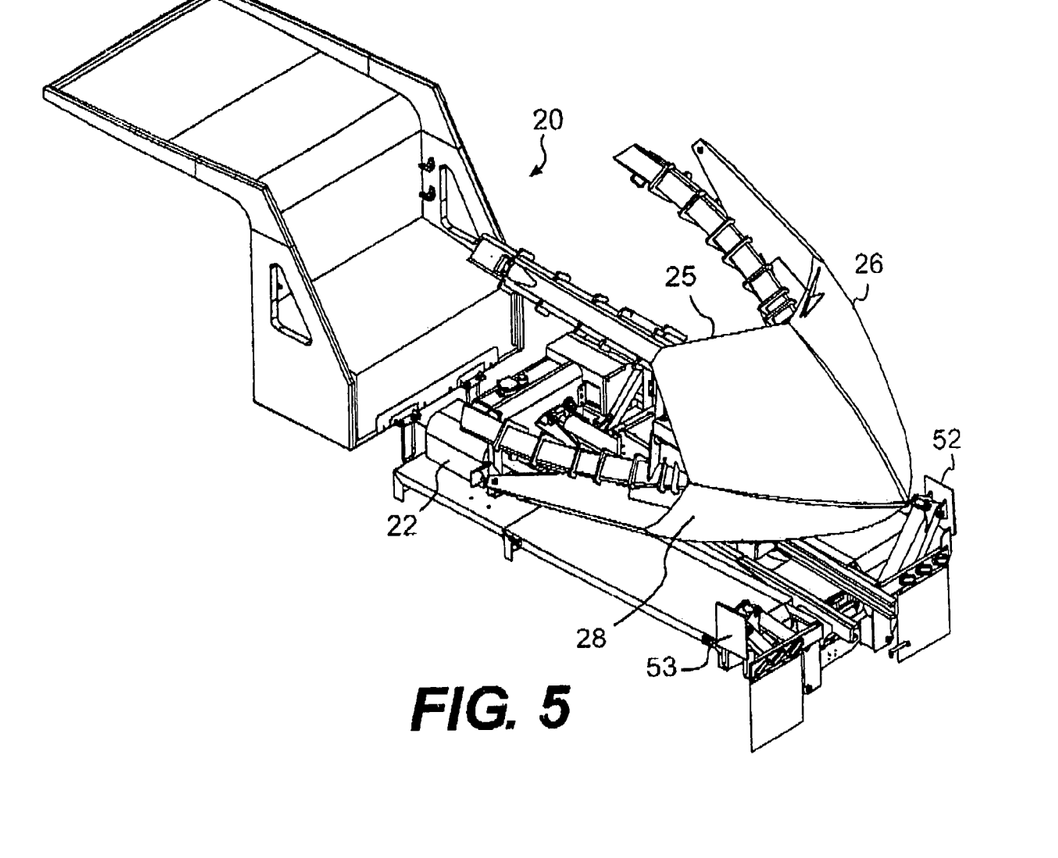
FIG. 5 is a perspective of the planter device with the spade mechanism tilted to a vertical position at the rear of the planter frame for lowering of the spades into the ground for the digging operation.
Figure 6:
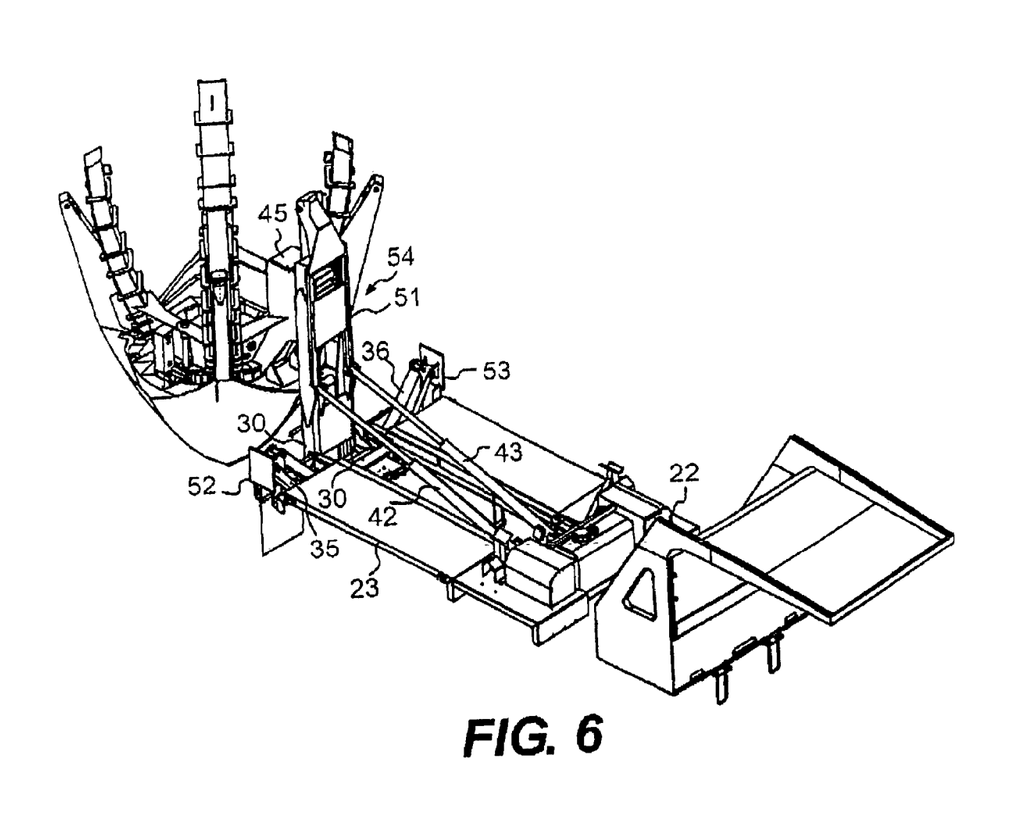
FIG. 6 is another perspective view of the planter device.
Figure 7A:
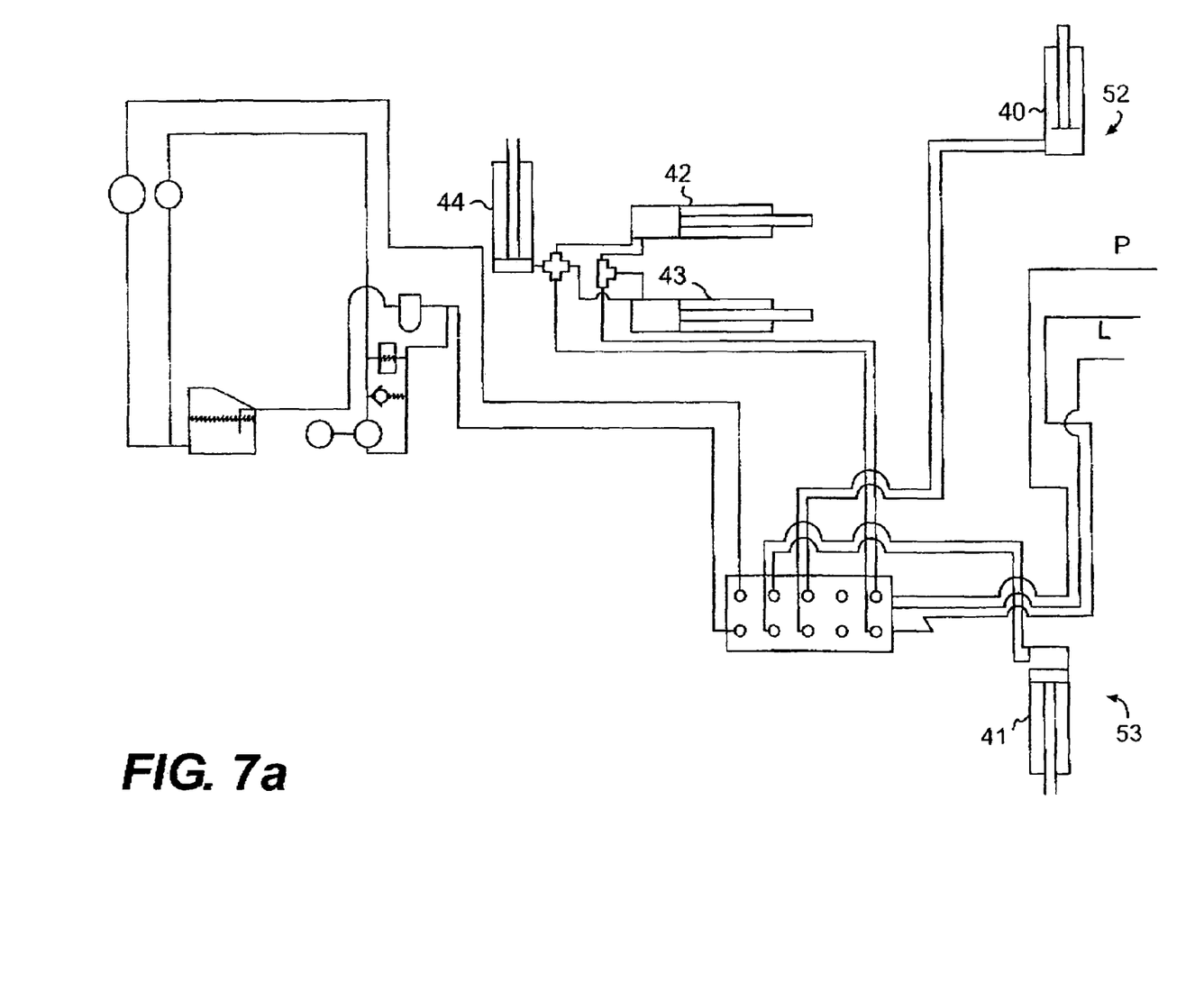
FIG. 7a is a schematic diagram of the left portion of the hydraulic system of the planter device, one of two sheets.
Figure 7B:
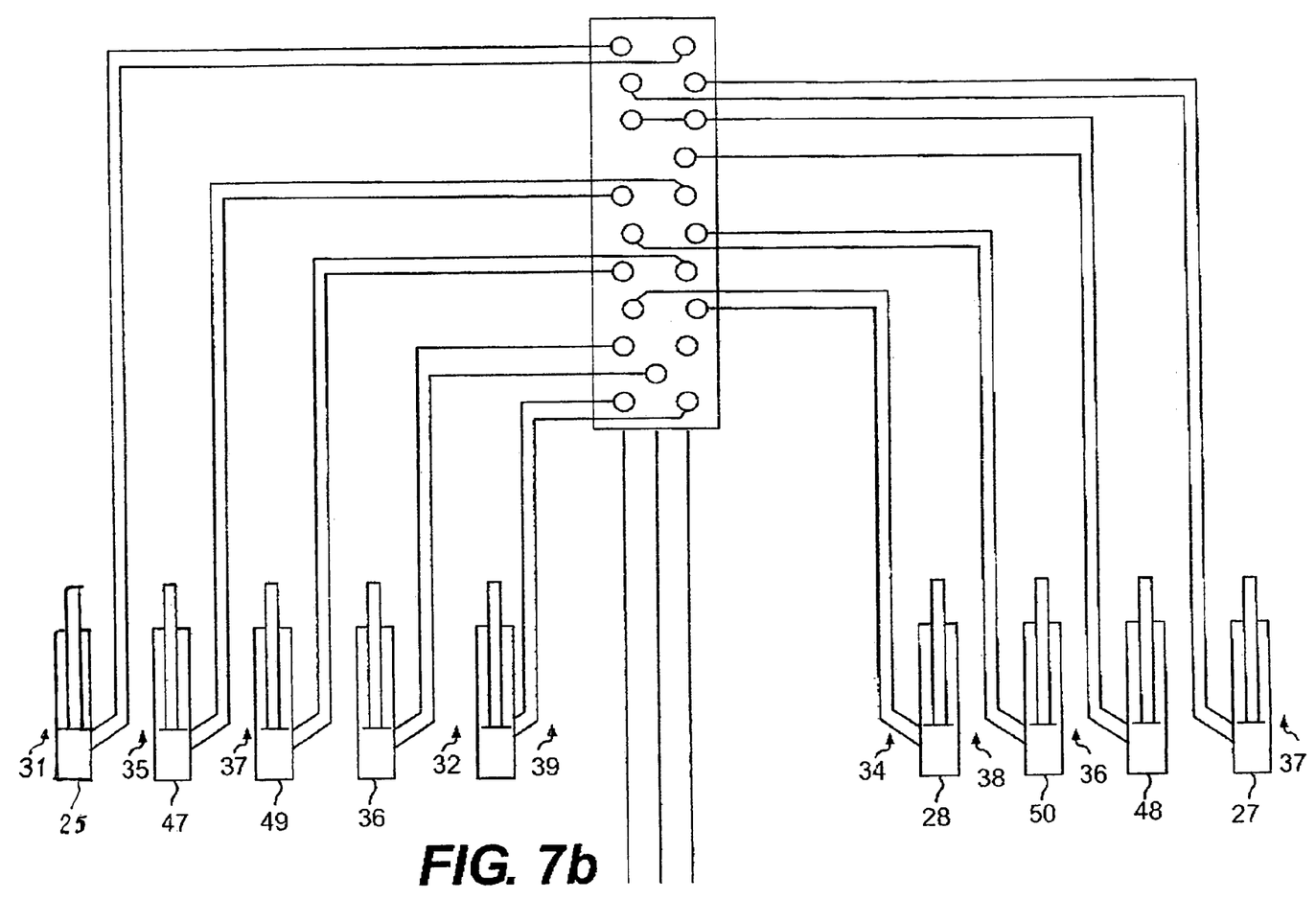
FIG. 7b is a schematic diagram of the right portion of the hydraulic system of the planter device, two of two sheets.
Figure 8:
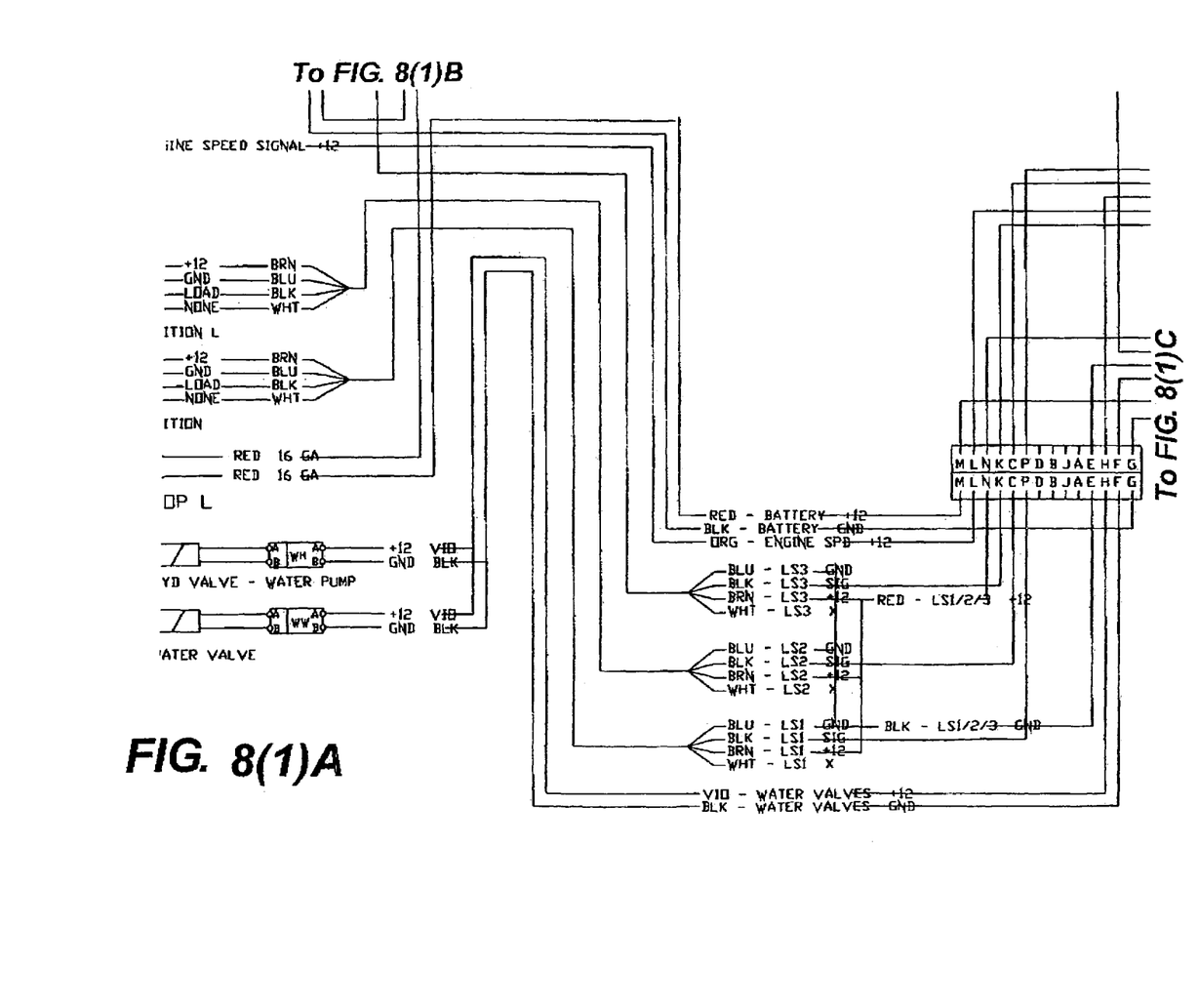

The hydraulic and electric circuit of the planter20, as shown in FIGS. 7a, 7b, 8(1)A-D,8(2)A-D has the 9 solenoid actuated control valves B1-B9 in box 45, which box is mounted to the mast as shown in FIG. 3. The 3 solenoid actuated valves A1,A2,A4 are mounted on the frame adjacent the fender 46 of a conventional tree planter. The movement of the four spades 25-28, the movement of the two levelers 47 and 48, the movement of the two gates 49 and 50, and the movement of the mast lift 51 are all controlled by the 9 solenoid actuated valves B1-B9 in the box 45, which, in turn, control the respective hydraulic pistons and cylinders for the respective components. The 3 solenoid actuated valves A1,A2,A4 on the outrigging of the planter control the two outriggers 52 and 53, and the tilt mechanism 54 of a conventional tree planter by controlling the actuation of the pistons and cylinders of these respective components.

Solenoid actuated valves B1-B4 control hydraulic pistons and cylinders 31,32,33,34 which actuate and provide the individual sliding movement of the four spades 25-28, respectively. Solenoid actuated valves B5 and B6 control hydraulic pistons and cylinders 35 and 36 which actuate and provide the movement of the two levelers 47 and 48.

Solenoid actuated valves B7 and B8 control hydraulic pistons and cylinders 37 and 38 which actuate and provide the movement of the two gates 49 and 50. Solenoid actuated valve B9 controls the piston and cylinder 39 to control the mast lift 51 movement of or on mast 30 to lift the four spades vertically once the mast is tilted vertically.

Solenoid actuated valves A1 and A2 control the hydraulic pistons and cylinders 40 and 41 which control the outrigging movement of outriggers 52 and 53.

Solenoid actuated valve A4 controls the three pistons and cylinders 42,43,44 which provide the tilting action of the mast to its vertical position.

All twelve solenoid controls are mounted on a central location on the frame and mast of the planter. The fourteen hydraulic pistons and cylinders of the planter are numbered 40-53, inclusive.

Operating Modes of the Planter:

The first mode of the planter is called the setting up mode.

The second mode of the planter is called the engaging mode.

The third mode of the planter is called the digging mode.

The $1^{st}$ mode is setting up of the machine or apparatus. The first mode or setting up mode has two sequences.

1a. Pulling the two outriggers 52 and 53 which are controlled by the hydraulic cylinders 40 and 41 by activation of the two fender solenoid activated valves A1 and A2 on the fender of the vehicle 1b manually unlocking the mast from the vehicle frame to enable the mast to be tilted.

The completion of the 1st mode enables the $2^{nd}$ mode to be performed.

The $2^{nd}$ mode has the following four operations:

2a. Tilting the mast with the four spades thereon to a vertical position by activation of solenoid activated mast tilt valve A4 on the fender which activates the pair of cylinders 42 and 43, and operates the initial activation cylinder 44 to tilt the mast to vertical.

2b. Lifting and lowering the mast with the spades, gates, and levelers thereon by actuating the solenoid actuated lift valve B1 which activates the lift cylinder 39 on the mast 30 to lower the four spades simultaneously on the mast lift 54 of the mast 30.

2c. Engaging the two clamps which were as gates which swing out from about the mast to surround the tree, by actuating the solenoid actuated valves B2 and B3 which actuates the cylinders 37 and 38 which closes the gates about the tree.

2d. Operating the pair of levelers to press down on the ball of dirt which may be in the spades, by actuating the solenoid actuated valves B4 and B5 which operates the two cylinders 35 and 36 which activates and lowers the two levelers.

The $3^{rd}$ mode activates the hydraulic movement of the four spades 25,26,27, and 28 upward and downward on the mast lift of the mast 30 of the planter by actuating solenoid valves B1-B5 which operates the four cylinders 31,32,33,34 which activates the raising and lowering of the four spades.

Figure 2:
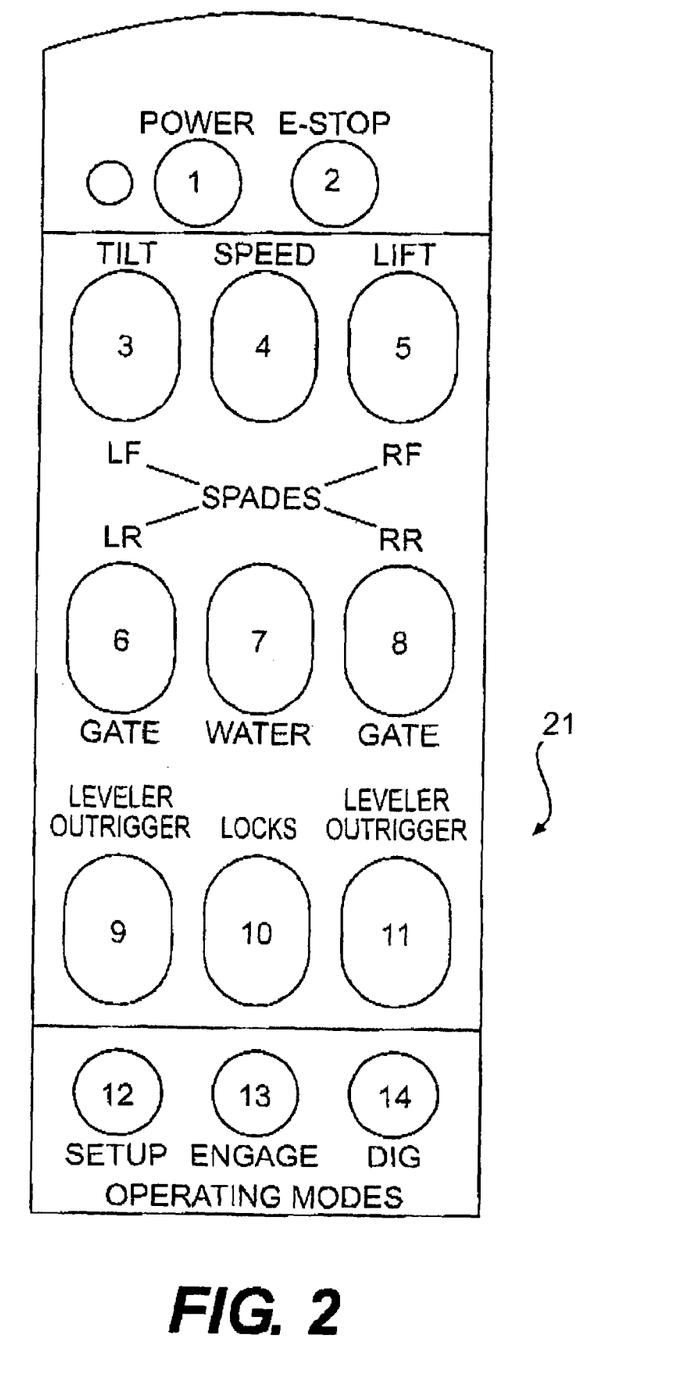
FIG. 2 is an enlarged top view of the radio transmitter illustrating the push button controls thereon to control the planter.

Radio Operation:

The radio transmitter 21, as shown in FIG. 2, has some fourteen push buttons, numbered 1-14, inclusive, on the buttons to operate the three modes of the planter 20.

Button 1 on the transmitter is a power button to turn on the electrical radio transmission of the signal to the electrical control box on the planter. The button 2 on the transmitter is an emergency stop button.

The six buttons 3-8, inclusive, operate to control the planter operation in each of the three modes of operation. The three buttons 12-14, inclusive control which of the three modes of operation the circuit is operating in. Which mode is determined by which of these three buttons are pressed by the operator.

If the button 12 is pressed, for example, the circuit is operating in the $1^{st}$ mode of operation, and the pressing of this button in turn activates buttons 9,10, and 11 on the transmitting panel, which perform the setting up mode of the planter. The radio signaling processing unit will remain in that mode until a different button 13 or 14 is pressed Pressing button 9 activates the cylinder for the left outrigger, pushing button 11 activates the right outrigger, and pushing button 10 locks both outriggers in their lowered leveling position. This completes the setting up mode.

If the button 13 is pressed, the circuit is activated in the second mode or engaging mode. In this mode, the six buttons 3-8, inclusive, are activated. Consequently, if button 3 is pressed it activates the tilting cylinders 42,43,44 to tilt the mast into a vertical position, and also activates the tilting assisting cylinder 44 which assists initially in the tilting operation. The activation of these cylinders tilts the mast of the planter to a vertical upright position as shown in FIG. 3. Pushing the speed button 2, in this case, increases the speed of the tilting action. Pushing the lift button 5 activates the lift cylinder 39 to raise or lower the four spades on the mast lift of the mast frame 30. Button 13 also activates the buttons 6-8, inclusive so that pressing button 6 opens the gates on the planter, and pushing button 8 closes the gates on the planter. Pushing button 7 provides water to the spades.

If button 14 is pressed, the circuit is activated in its third mode of operation or the digging mode. The pressing of the button 14 now acts to activate buttons 3,5, 6 and 8 to individually control the movement of the spades. Consequently, pushing button 3 now acts to lower the spade 25 relative to the mast frame by activating cylinder 52, pushing button 5 now acts to lower the spade 26 by activating cylinder 53, pushing button 6 now acts to lower spade 27 by activating cylinder 54, and finally pushing button 8 now acts to lower spade 28 by activating the cylinder 55. The speed button 4 will act in each of the cases to control the speed of lowering the spades by controlling the speed of the telescoping pistons of these cylinders.

Each of the buttons 3 to 11 of the transmitter 21 are rocker arm type buttons so that the buttons can be tilted forward and pressed downward when moving the piston of the cylinders in one direction and may be tilted rearward and pressed downward when activation the piston to move in the opposite direction and thereby change the direction of the spades, outriggers, levelers, and gates of the planter 20. The pistons will continue to telescope or retract as long as the operator continues to press the button in that direction The mechanical structure associated with the fourteen hydraulic piston and cylinder operation of the planter is conventional and well known, including the four spade operation, the mast tilt and mast lift, the outrigging and gate operation. However, in the past, the hydraulic piston and cylinder operation had been actuated and controlled by manual handles to the hydraulic valves.

While the radio remote control of the planter functions and the electrical circuitry and processing of the signals to electrically to solenoid controlled valves and its associated operation provide the new improvements in its operation.

It will be obvious that various changes and departures may be made to the invention without departing from the spirit and scope thereof, and accordingly, it is not intended that the invention be limited to that specifically described in the specification or as illustrated in the drawings, but only as set forth in the appended claims wherein:

What is claimed:

1. A tree planter comprising a mobile frame, four spades, a tilt frame mounted on said mobile frame, and four spades slidably mounted on said tilt frame, said tilt frame adapted to tilt on a pivot from a horizontal position on said mobile frame to a vertical position beside the mobile frame, a slidable frame on said tilt frame to slide said four spades simultaneously vertical when said tilt frame is vertical, said four spades being individually slidable on said slidable frame of said tilt frame when said tilt frame is vertical to slide vertically downward into the ground for digging or planting a tree;

solenoid actuated hydraulic telescoping piston and cylinders on said planter for powering said individual and simultaneous sliding action of each of said four spades, to actuate said tilt fame for said pivotal movement between horizontal and vertical and to actuate said movement of said slidable frame on said tilt frame, a radio receiver and digital control means on said planter;

a remotely located portable radio transmitter for transmitting radio signals, said transmitter having a plurality of buttons to selectively transmit radio signals to said receiver corresponding to which of said solenoid actuated piston and cylinders desirous of being actuated, the radio receiver to receive said radio signals from said receiver and transmit electrically said signals to said digital control means, said digital control means programed to receive electrical signals from said receiver and actuate selected one of said solenoid actuated hydraulic telescoping piston and cylinder to operate selectively said movements of said spades to perform said digging or planting operating by said spades with said operation of said planter being controlled by said transmitter from a remote location;

said planter has a pair of outriggers with the solenoid actuated hydraulic pistons and cylinders to lower and raise said outriggers to engage and disengage the ground adjacent the planter, said digital programming means includes a program to activate said piston and cylinders of said outrigger, said radio receiver having at least three operating modes with a button on said receiver to activate each mode;

one of said modes includes activating outrigging buttons where upon pressing of said buttons activates said pistons and cylinders of said outriggers to cause lowering the outriggers to engage the ground adjacent the planter;

said receiver having a tilt button and a tilt piston and a sliding button, said second of the modes being activated by the pressing and engaging of the second of said three mode buttons to activate the tilt button, causes the receiver to transmit a radio signal to the receiver to cause the programming means to activate the tilt piston and cylinder to tilt the tilt frame to vertical and tilt the spades thereon to vertical and cause activation of a sliding button which upon pressing of the sliding button causes the receiver to transmit a radio signal to the receiver to cause the programming means to activate the sliding piston and cylinder to slide the spades simultaneously on the tilt frame;

with the third of said modes being activated by the pressing of the third of said mode buttons which activates four individual bottons on the receiver which upon pressing a selected one of these buttons causes the solenoid actuated hydraulic piston and cylinder for said selected one of the spades to be individually lowered on the sliding frame on the tilt frame.

2. A tree planter device comprising a mobile frame and a radio transmitter, a tilt frame mounted on said mobile frame, four spades mounted in a circumferential relation about one another on said tilt frame, a radio receiver mounted on said mobile frame;

said radio receiver, mounted on said mobile frame, acting to control the movement of said tilt frame and said four spades by said receiver acting to actuate at least a solenoid actuated hydraulic telescoping piston and cylinder on said planter actuatable to move said tilt frame to or from a substantially horizontal position to or from a substantially vertical position, said receiver acting to actuate a solenoid actuated hydraulic telescoping piston and cylinder means on said planter for movement of said four spades on said tilt frame in a substantially vertical direction to operate selectively said movement of said four spades and said tilt frame for a digging or planting operation with said transmitter transmitting said signals from various locations to said receiver on said mobile frame.

3. A tree planting device according to claim 2 wherein said device has outriggers mounted to said frame with hydraulics cylinder means activated by said receiver to move said outriggers into engagement with the ground for stabilizing the device on the ground when operating the four spades.

4. A tree planting device according to claim 3 wherein said receiver has at least three operating modes for controlling the outriggers, the tilt frame and the hydraulically actuated four spades respectively, to operate the four spades for the digging operation of the planter device.

5. A tree planter device comprising a mobile frame and a portable radio transmitter, a tilt frame mounted on said mobile frame, four spades mounted in a circumferential relation about one another on said tilt frame, a radio receiver mounted on said device, said transmitter being portable to various locations independently of said device, acting to control the movement of said tilt frame, at least a solenoid actuated hydraulic telescoping piston and cylinder on said planter actuatable by said receiver to move said tilt frame to or from a substantially horizontal position to or from a substantially vertical position, solenoid actuatable hydraulically telescoping piston and cylinder means for said four spades, said receiver acting to control said four spades movement on said tilt frame, by actuating said solenoid means for said four spades which in turn actuates hydraulic piston and cylinder means on said tilt frame to lower said four spades into the ground for a digging or planting operation, said portable transmitter capable of movement to various locations to transmit said signals to said receiver on said mobile frame.

* * * * *